(12) United States Patent
Gamberini

(10) Patent No.: US 9,359,145 B2
(45) Date of Patent: Jun. 7, 2016

(54) ROLLER DRIVEN DEVICE FOR ROLLER CONVEYORS

(71) Applicant: Dugomrulli S.r.l., Zola Predosa (IT)

(72) Inventor: Giorgio Gamberini, Zola Predosa (IT)

(73) Assignee: Dugomrulli S.r.l., Zola Predosa (IT)

( * ) Notice: Subject to any disclaimer, the term of this patent is extended or adjusted under 35 U.S.C. 154(b) by 0 days.

(21) Appl. No.: 14/791,337

(22) Filed: Jul. 3, 2015

(65) Prior Publication Data

US 2016/0009499 A1   Jan. 14, 2016

(30) Foreign Application Priority Data

Jul. 8, 2014 (IT) .............................. BO2014A0380

(51) Int. Cl.

| | |
|---|---|
| B65G 39/02 | (2006.01) |
| B65G 13/02 | (2006.01) |
| B23K 37/00 | (2006.01) |
| B65G 39/09 | (2006.01) |
| B65G 13/04 | (2006.01) |
| B65G 39/00 | (2006.01) |
| B65G 13/07 | (2006.01) |

(52) U.S. Cl.
CPC ................ *B65G 39/02* (2013.01); *B23K 37/00* (2013.01); *B65G 13/02* (2013.01); *B65G 13/04* (2013.01); *B65G 13/07* (2013.01); *B65G 39/00* (2013.01); *B65G 39/09* (2013.01)

(58) Field of Classification Search
CPC ........ B65G 13/04; B65G 13/07; B65G 39/02; B65G 39/07; B65G 39/09; B65G 39/00; B23K 37/00

USPC .......... 198/780, 781.03, 781.09, 781.11, 790; 492/37

See application file for complete search history.

(56) References Cited

U.S. PATENT DOCUMENTS

| | | | |
|---|---|---|---|
| 6,502,690 B1* | 1/2003 | Specht ................... | B65G 13/07 198/781.07 |
| 6,971,505 B2* | 12/2005 | Gutekunst ............ | B65G 21/209 198/781.1 |
| 2006/0102451 A1* | 5/2006 | Gamberini ............. | B65G 39/02 198/780 |
| 2008/0010831 A1* | 1/2008 | Gamberini ............. | B65G 13/04 29/895.21 |
| 2008/0236998 A1 | 10/2008 | Shurko | |

FOREIGN PATENT DOCUMENTS

DE    198 23 430    12/1999

* cited by examiner

*Primary Examiner* — Gene Crawford
*Assistant Examiner* — Keith R Campbell
(74) *Attorney, Agent, or Firm* — Ware, Fressola, Maguire & Barber LLP

(57) ABSTRACT

A roller driven device for roller conveyors includes a cylindrical and tubular roller configured to rotate around its geometric axis, and having at each end a respective first lateral wheel and a second lateral wheel. At least the first lateral wheel has a tubular cylindrical element having at its end facing the second lateral wheel a first flange and at the opposite end a second flange. The device further includes a ring whose axial length ranges from two thirds to one twentieth of the axial distance between the first flange and the second flange of the first lateral wheel. An end of the ring is positioned between the first flange and the second flange and the end is fixed to the outer surface of the roller, where the end portion of the roller is fixed at the central hole of the second flange.

15 Claims, 3 Drawing Sheets

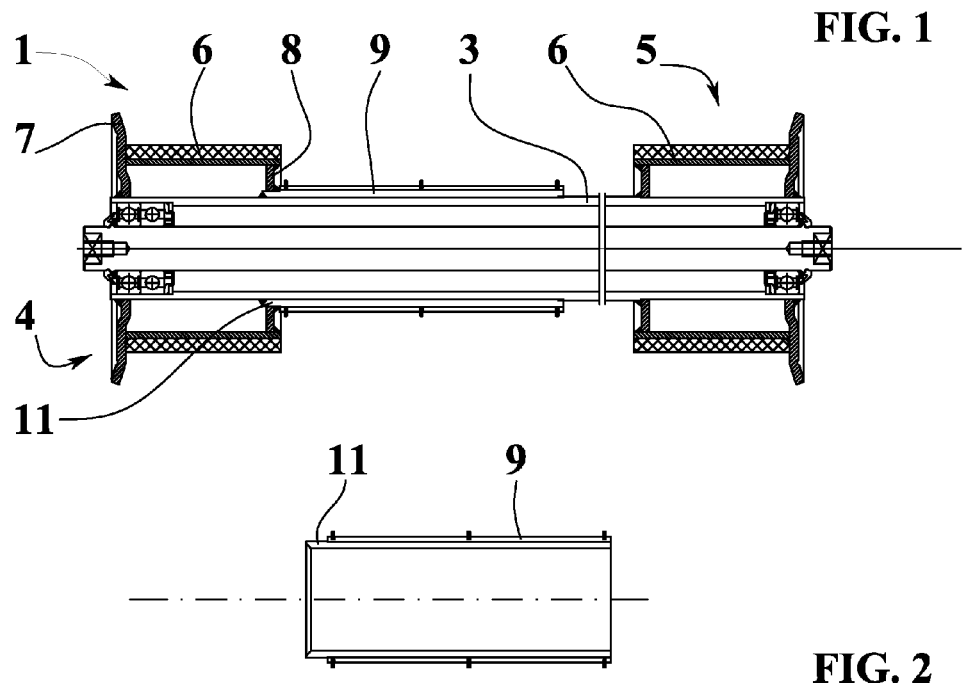
FIG. 1
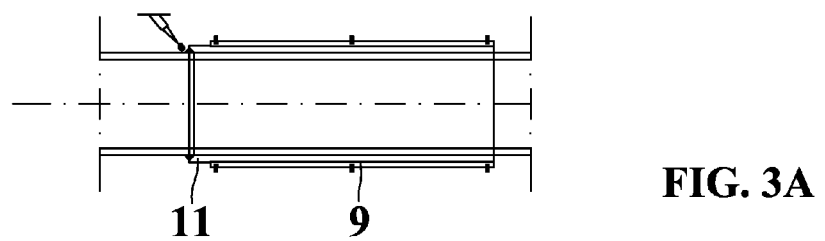
FIG. 2
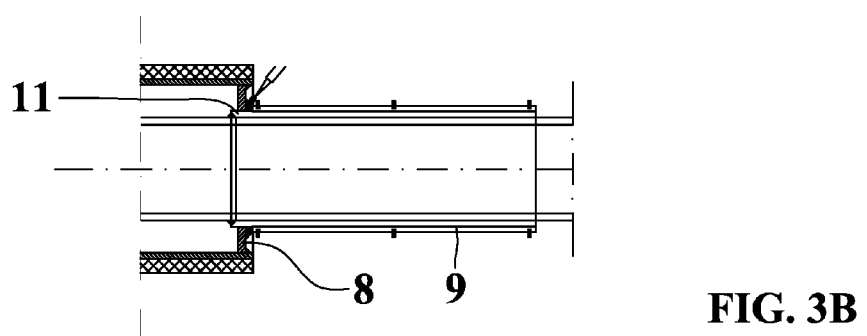
FIG. 3A
FIG. 3B

FIG. 6
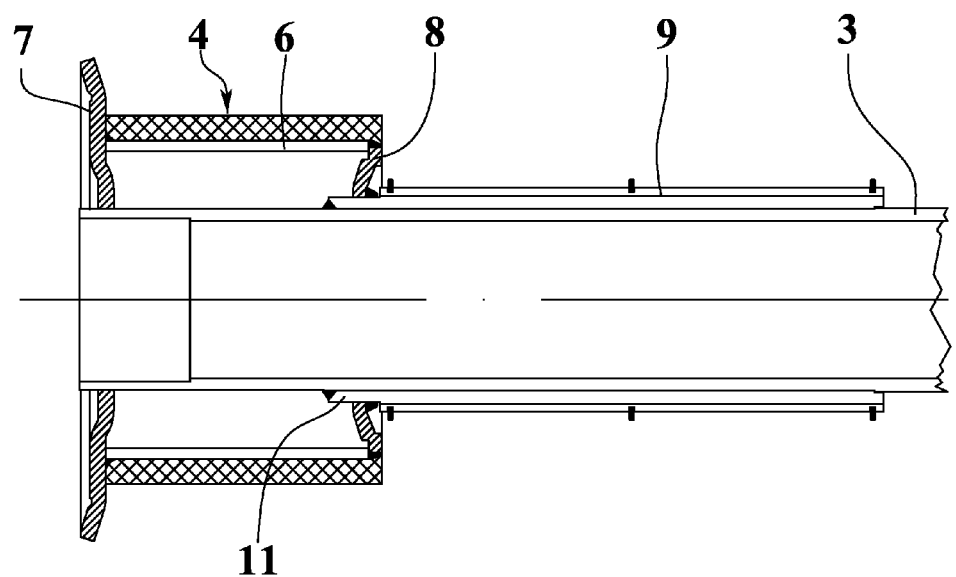
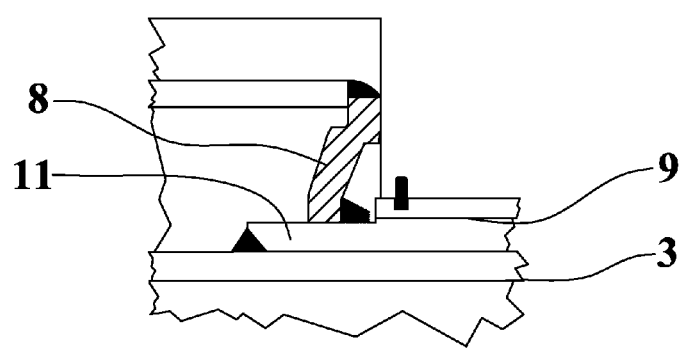
FIG. 7

ROLLER DRIVEN DEVICE FOR ROLLER CONVEYORS

CROSS-REFERENCE TO RELATED APPLICATIONS

This application claims priority to Italian Appl. No. BO2014A000380 filed Jul. 8, 2014, which is hereby incorporated by reference in its entirety.

TECHNICAL FIELD

The present invention concerns the technical field of roller conveyors for transporting goods possibly supported by frames, slides or pallets, and it refers to a roller driven device, in other words to a motorized roller, for roller conveyors.

BACKGROUND

Roller driven devices are known, each of them comprising a tubular cylindrical roller supported, through bearing, by an axis or by another kind of support. Each end of the roller is provided with a respective wheel or bushing (in the following the latter element will be named "wheel"). The known devices further comprise a single or double pulley fixed to the external surface of the cylindrical roller adjacent to one of the side wheels. The pulley usually is a timing pulley for timing belts, and it transmits to the device the motion for the rotation of the device around the axis of the roller provided by the belt engaged to the drive pulley of an engine.

In some of the roller devices the pulley is fixed closer to the respective wheel, and it is fixed to the roller by means of an annular welding made at the external end, in other words, at the end close to the wheel, of the pulley whose opposite end is not welded to preserve the roller strength in its area more affected by flexion and stresses. This avoids weakening of the roller but because of the close distance between the pulley and the adjacent inner flange of the wheel, does not allow to weld the inner flange to the roller on the contrary to the inner flange of the opposite wheel of the device.

A drawback of the known solution consists in that, in the event of abnormal and/or very high and/or axial components stresses, acting on the wheel adjacent to the pulley, the connection between the wheel and the roller could be damaged.

U.S. Appl. Publ. No. 2008/0010831 discloses a process for making a roller for conveying products along a predetermined path in an industrial installation, where a portion for rotationally driving the roller includes a tubular element and is associated with a rotatable roller support of the same roller in the form of a long tubular body.

U.S. Appl. Publ. No. 2006/0102451 discloses roller driven device for roller conveyors comprising a tubular roller, freely rotating around its geometric axis and having at each end a respective lateral wheel each comprising a tubular cylindrical element having an external protruding flange and an internal flange where the tubular cylindrical element and the two flanges are integral. The roller driven device comprises a timing pulley adjacent to a first lateral wheel and a sleeve inside the timing pulley and to the first lateral wheel and containing a respective end of the tubular roller. The end of the tubular roller is welded to the inner surface of the sleeve. The end of the sleeve can be welded inside the inner cavity of the first wheel (as shown in FIGS. 1A and 1B of document U.S. Appl. Publ. No. 2006/0102451) or to the side external surface of the external protruding flange of the first wheel (as shown in FIGS. 2A and 2B of document U.S. Appl. Publ. No. 2006/102451). In this latter case, the end of the roller and the respective welding to the inner surface of the sleeve is quite deep inside the sleeve, at least to leave space for the bearings.

Both solutions are affected by the difficulty of carrying out inner weldings.

A further drawback of both solutions consists in that no direct welding or direct fixing are carried out between the roller and the first wheel.

Another drawback of both solutions consists in that provide only one (indirect) connection between the roller and the first wheel.

A further drawback of both solutions consists in that the end of the sleeve opposed to the first wheel must be welded to the roller close to the median portion thereof, increasing the risks to weaken the roller in the critical position.

A drawback of the first known solution consists in that the first wheel must be solid to provide the welding surface, and must be complex and expensive because of the bearing housing carried out in the body of the first wheel.

A drawback of the second known solution consists in that the fixing of the first wheel to the roller is made by two sequential and spaced welding increasing the risk of mispositioning and/or misalignment.

SUMMARY OF THE INVENTION

An object of the present invention is to overcome the drawback of the second mentioned document.

An object of the present invention is to propose a device that can support very strong stresses.

Further object of the present invention is to propose a device that is easy to manufacture.

Another object of the present invention is to propose a device provided with very light weight but with strong side wheels.

An exemplary embodiment of the present invention is directed to a roller driven device for roller conveyors includes a cylindrical and tubular roller configured to rotate around its geometric axis and having at each end a respective first lateral wheel and a second lateral wheel. At least the first lateral wheel has a tubular cylindrical element having at its end facing the second lateral wheel a first flange and at the opposite end a second flange, wherein both the first flange and the second flange are in the shape of a annulus. The device further includes a pulley fixed to the outer surface of the roller adjacent to the first lateral wheel to transmit to the device, via a belt or the like, an axial rotary motion. The device further includes a ring whose axial length ranges from two thirds to one twentieth of the axial distance between the first flange and the second flange of the first lateral wheel. The outer surface of the ring is engaged and fixed to a central hole of the first flange. An end of the ring is positioned between the first flange and the second flange and the end is fixed to the outer surface of the roller, wherein the end portion of the roller is fixed at the central hole of the second flange.

BRIEF DESCRIPTION OF THE DRAWINGS

The features of the invention are highlighted in the following with references to the enclosed drawings where:

FIG. 1 shows a partial view of the device of the present invention sectioned by an axial plane;

FIG. 2 shows a sectional view of a pulley means of FIG. 1;

FIG. 3A shows a partial and sectional view of a first manufacture phase of the device of the present invention;

FIG. 3B shows a partial and sectional view of a second manufacture phase of the device of the present invention;

FIG. 6 shows a partial sectional view of a further variant of the device of FIG. 1; and FIG. 7 shows an enlargement of a detail of FIG. 6.

DETAILED DESCRIPTION OF THE INVENTION

Figure 3C:
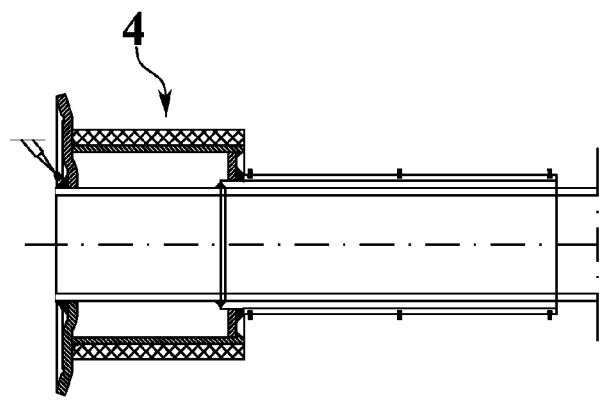
FIG. 3C shows a partial and sectional view of a third manufacture phase of the device of the present invention.

With reference to FIGS. 1-3C, reference numeral 1 generally indicates the roller driven device, of the present invention, for roller conveyors.

The roller driven device 1 comprises a cylindrical and tubular roller 3, rotating around its geometric axis, and having at each end thereof a respective first lateral wheel 4 and a second lateral wheel 5.

At least the first lateral wheel 4 has a tubular cylindrical element 6, whose diameter is larger than the diameter of the roller 3, said tubular cylindrical element 6 having at its end facing the opposed second wheel 5 a first flange 8, and at the opposite end a second flange 7. Both the flanges 8, 7 are annulus shaped. The thickness of the tubular cylindrical element 6 and of the flanges 8, 7 preferably ranges from 1 mm to 10 mm.

The device 1 further comprises a pulley 9 fixed to the outer surface of the roller 3 adjacent to the first lateral wheel 4 to transmit to the device 1, via a belt or the like, an axial rotary motion.

The device 1 further comprises a ring 11 whose axial length ranges from two thirds to one twentieth of the axial distance between the first flange 8 and the second flange 7 of the first lateral wheel 4.

The diameter of the central hole of the second flange 7 is almost equal to the external diameter of the roller 3, and the diameter of the central hole of the first flange 8 is almost equal to the external diameter of the ring 11.

The ring 11 is interposed between the first flange 8 and the roller 3, and the ring 11 is fixed to the flange 8 and to the roller 3. The outer surface of the ring 11 is engaged and fixed to the central hole of the first flange 8. Consequently, an end of the ring 11 is situated between the first flange 8 and the second flange 7, and said end of the ring 11 is fixed to the outer surface of the roller 3.

The end portion of the roller 3 opposed to the second lateral wheel 5 is fixed to the central hole of the second flange 7 of the first lateral wheel 4.

The fixing of the outer surface of the ring 11 to the central hole of the first flange 8 is carried out between said outer surface of the ring 11 and the surface of the first flange 8 around the respective hole and opposite to the second flange 7.

The fixing of the end portion of the roller 3 to the central hole of the second flange 7 is carried out between the outer surface of the end portion of the roller 3 and the surface of the second flange 7 around the respective hole and opposite the first flange 8.

The roller 3, the ring 11 and at least the flanges 8, 7 are made of metal, preferably of iron, and the fixings of the end of the ring 11 to the outer surface of the roller 3, of the outer surface of the ring 11 to the surface of the first flange 8 around the respective hole and opposite to the second flange 7 and of the outer surface of the end portion of the tubular roller 3 to the surface of the second flange 7 around the respective hole and opposite to the first flange 8, are carried out by the welding of the kind that provides melting of the base metal and addition to the joint of a metal filler material.

Must be noted that the above described solution provides only easy to perform weldings and avoid difficult to carry out inner weldings.

The solution in object provides a double fixing of the first wheel 4 to the roller 3 and one of said fixing is direct between the two parts and furthermore provides welded fixings only on the portion of the roller 3 close to the first wheel 4 avoiding welding in the most delicate portion of the roller 3 avoiding weakening of the latter.

A further topic of the solution in object consists in that the wheel can be made in a simple, light and cheap manner by welding to the each tubular cylindrical element 6 the two respective flanges 8,7.

Furthermore the solution in object allows an adequate precision of the fixing without needs of special and expensive provisions.

In the embodiment of FIGS. 1-3C said annular 11 is integral, or in other word in single body, with the pulley 9 and protrudes outward an end of the latter.

The roller 3 is provided with an annulus shoulder, for instance carried out on the roller means by turning process; said annulus shoulder matches with the inner end portion of the pulley means opposed to the ring means centering, with reduced play, the pulley means in respect to the roller 3.

Preferably the pulley 9 is timing type, preferably with two sets of teeth, for two not illustrated timing belts operated by an engine, for instance of electric kind.

Preferably, each tubular cylinder 6 of the wheels 4, 5 is provided with a respective anti-slip synthetic coating and the second flange 7 radially protrudes in respect to the respective tubular cylinder 6 to provide a guide or a side stopper for the load.

The inner end portions of the roller means consist in a housing for respective bearings assigned to the free rotating support of the device.

Figure 4:
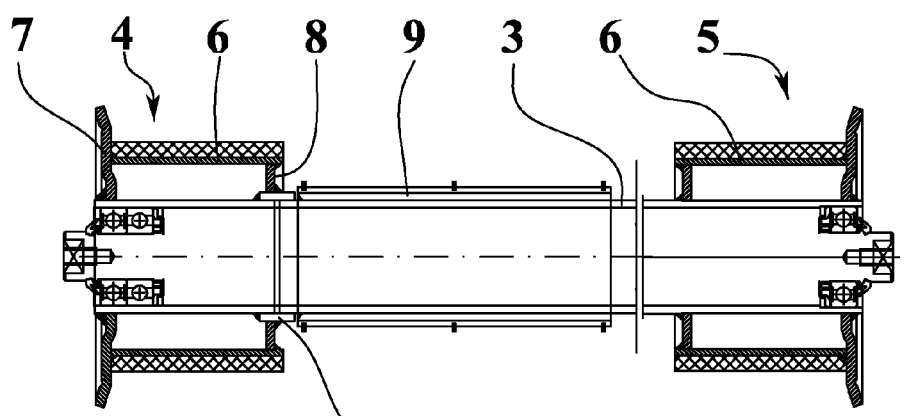
FIG. 4 shows a partial and sectional view of a variant of the device of FIG. 1.
Figure 5:
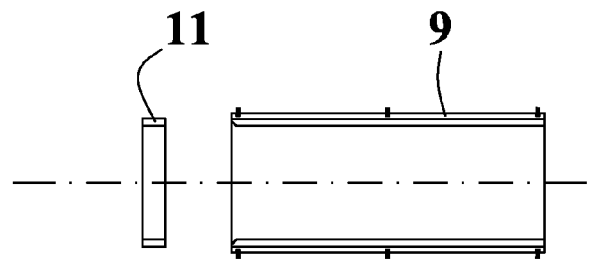
FIG. 5 shows an annular means and a pulley means of FIG. 4.

In the variant of FIGS. 4 and 5 the ring 11 consists in an independent tubular cylindrical element separated from the pulley 9.

In this variant, the end of the pulley 9 adjacent to the ring 11 is fixed, preferably by welding, to the outer surface of the roller 3. In alternative, the invention further provides that the ring 11 is integral with the roller 3, in this case the ring 11 can be carried out in the same phase and with the same tool for carrying out the annulus shoulder.

Must be noted that all the fixing weldings of the device can be carried out in respective concave annular sides easily accessible for the manual and automatic welding tools.

In the variant of FIGS. 6 and 7 the first flange 8 of at least the first lateral wheel 4 is concave shaped with the concavity facing the opposite second wheel 5; consequently the central hole of the first flange 8 is shifted toward the external end of the respective ring 11.

The welding between the first flange 8 and the tubular cylindrical element 6 can be carried out at the inner end of the latter 6.

This arrangement facilitates the welding of the first flange 8 to the respective ring 11 particularly when the latter 11 is integral with the pulley 9 as illustrated in the FIGS. 6 and 7, and it facilitates the welding between the first flange 8 and the respective tubular cylindrical element 6.

The method to make the device 1 provides:
 to insert the pulley 9 and the ring 11 on the roller 3 and to weld them 9, 11 to said roller 3,
 to insert the first wheel 4 on the respective roller 3 end portions and to weld the first flange 8 to the ring 11;

to weld the remaining second flange 7 of the first wheel 4 to the roller 3;

to insert and to weld the second wheel 5 to the end portion of the roller 3 opposite to the first wheel 4.

What is claimed is:

1. A roller driven device for roller conveyors, comprising:
    a cylindrical and tubular roller configured to rotate around its geometric axis and having at each end a respective first lateral wheel and a second lateral wheel, wherein at least the first lateral wheel has a tubular cylindrical element having at its end facing the second lateral wheel a first flange and at the opposite end a second flange, wherein both the first flange and the second flange are in the shape of a annulus;
    a pulley fixed to the outer surface of the roller adjacent to the first lateral wheel to transmit to the device an axial rotary motion; and
    a ring with an axial length between two thirds to one twentieth of the axial distance between the first flange and the second flange of the first lateral wheel, wherein the outer surface of the ring is engaged and fixed to a central hole of the first flange, wherein an end of the ring is positioned between the first flange and the second flange and the end of the ring is fixed to the outer surface of the roller, wherein an end portion of the roller is fixed to the central hole of the second flange.

2. The roller driven device according to claim 1, wherein the fixing of the outer surface of the ring to the central hole of the first flange is carried out between said outer surface of the ring and the surface of the first flange around the respective hole and opposite to the second flange.

3. The roller driven device according to claim 1, wherein the fixing of the end portion of the roller to the central hole of the second flange is carried out between the outer surface of the end portion of the roller and the surface of the second flange around the respective hole and opposite to the first flange.

4. The roller driven device according to claim 1, wherein the roller, the ring and at least the first flange and second flange are made of metal and the fixings of the end of the ring to the outer surface of the roller, of the outer surface of the ring to the surface of the first flange around the respective hole and opposite to the second flange and of the outer surface of the end portion of the roller to the surface of the second flange around the respective hole and opposite the first flange, are carried out by the welding that provides melting of the base metal and addition to the joint of a metal filler material.

5. The roller driven device according to claim 1, wherein the ring is comprised of an independent tubular cylindrical element.

6. The roller driven device according to claim 5, wherein the end of the pulley adjacent to the ring is fixed to the outer surface of the roller.

7. The roller driven device according to claim 1, wherein the ring is comprised of a cylindrical tubular element integral with the pulley and projecting from the end of the pulley adjacent to the first wheel.

8. The roller driven device according to claim 1, wherein the inner end portion of the pulley opposite to the ring matches with the outer surface of the roller with a reduced play.

9. The roller driven device according to claim 1, wherein the pulley is a timing pulley for timing belts.

10. The roller driven device according to claim 6, wherein the pulley has two sets of teeth for two belts.

11. The roller driven device according to claim 1, wherein each tubular cylinder of the first lateral wheel and the second lateral wheel is provided with a respective anti-slip synthetic coating.

12. The roller driven device according to claim 1, wherein the second flange radially protrudes in respect to the respective tubular cylinder element.

13. The roller driven device according to claim 1, wherein the inner end portions of the roller comprises a housing for respective free rotating bearings.

14. The roller driven device according to claim 1, wherein the first flange of at least the first lateral wheel is concave shaped with the concavity facing the opposite second lateral wheel.

15. A method of manufacturing a device comprising a cylindrical and tubular roller configured to rotate around its geometric axis and having at each end a respective first lateral wheel and a second lateral wheel, wherein at least the first lateral wheel has a tubular cylindrical element having at its end facing the second lateral wheel a first flange and at the opposite end a second flange, wherein both the first flange and the second flange are in the shape of a annulus;
    a pulley fixed to the outer surface of the roller adjacent to the first lateral wheel to transmit to the device an axial rotary motion; and
    a ring with an axial length between two thirds to one twentieth of the axial distance between the first flange and the second flange of the first lateral wheel, wherein the outer surface of the ring is engaged and fixed to a central hole of the first flange, wherein an end of the ring is positioned between the first flange and the second flange and the end of the ring is fixed to the outer surface of the roller, wherein an end portion of the roller is fixed to the central hole of the second flange, wherein the method comprises:
    inserting the pulley and the ring on the roller and welding them to said roller;
    inserting the first lateral wheel on the respective roller end portions and welding the first flange to the ring;
    welding the remaining second flange of the first wheel to the roller; and
    inserting and welding the second lateral wheel to the end portion of the roller opposite to the first lateral wheel.

* * * * *